United States Patent [19]

Green et al.

[11] 4,147,112

[45] Apr. 3, 1979

[54] CARGO SUPPORT

[76] Inventors: Carlos J. Green, 4312 Neyrey Dr.; L. John Hirsius, Jr., 4400 Neyrey Dr., both of Metairie, La. 70002

[21] Appl. No.: 820,756

[22] Filed: Aug. 1, 1977

[51] Int. Cl.² .............................................. B61D 45/00
[52] U.S. Cl. ...................................... 105/463; 105/367
[58] Field of Search .............. 105/367, 463; 108/55.1, 108/52.1, 51.1; 214/10.5 R, 621; 211/34, 36, 37, 187

[56] References Cited

U.S. PATENT DOCUMENTS

| 1,559,827 | 11/1925 | Wittman | 214/10.5 R |
|---|---|---|---|
| 1,638,612 | 8/1927 | Baus | 214/10.5 R |
| 3,490,583 | 1/1970 | Cook | 214/10.5 R |
| 3,601,256 | 8/1971 | Bowers, Jr. | 214/187 |
| 3,878,942 | 4/1975 | Hansen et al. | 105/367 |
| 4,014,435 | 3/1977 | Rowlel et al. | 214/10.5 R |

Primary Examiner—Francis S. Husar
Assistant Examiner—Lawrence E. Williams

[57] ABSTRACT

A cargo support is disclosed which is comprised of a lower horizontal member, an upper vertical brace connected rigidly thereto forming a substantially L-shaped frame. The lower horizontal member contacts the floor and is provided with a plurality of skid preventive spikes. The lower horizontal floor contacting member is additionally beveled so as to tilt any load which sits upon it in a direction away from the support, thus causing a shift in its weight. The floor spikes can be alternatively in the form of rubberized discs or the like for use on smooth surfaces. The cargo support can be used under for example, conventional pellets being transported by moving carriers such as truck, railroad, airplane and the like.

10 Claims, 5 Drawing Figures

CARGO SUPPORT

BACKGROUND OF THE INVENTION

1. Field of the Invention

The present invention relates to cargo handling and more particularly relates to a cargo support which retains loaded materials (especially palletized loads) in a tightly packed group as originally arranged on a railroad boxcar, truck, airplane, or like moving load carrier.

2. General Background and Prior Art

When loads are transported on railroad boxcars, barges, airplanes, ships, and like moving carriers, a problem arises in that the nature of the moving carrier causes the carried loads within to shift, slide, topple, or lean. There is a need for a device which can be used to prevent the shifting, tilting and like within such movable and moving carriers.

A device to prevent load shifting and like movement would be especially useful in combination with palletized loads, since a majority of loading is done on "pallets" which facilitate the loading and removal of various types of similar loads from trucks, boxcars, and the like. The palletized loads are normally moved by means of a forklift or like piece of equipment, which grasps the pallet itself and places it onto the desired carrier. There is often required additional blocking, bracing and the like to the palletized loads once they are on the various movable carriers, which requires a substantial amount of extra labor and costs.

3. General Discussion of the Present Invention

The present invention provides a frame made of light weight but structurally sound material having a generally L-shaped frame which is comprised of a lower horizontal floor contact member and an upper vertical brace member arranged at ninety (90°) degrees thereto. The lower horizontal floor contacting portion of the overall frame is beveled providing a thicker portion near the connection of the upper vertical brace member and a slimmer tip portion which is insertable under the desired load. The tapered effect provided by the lower floor contacting member tilts the load away from the apparatus and thus encourages any movement of the load away from the apparatus rather than toward it which would be undesirable. The floor contacting member is provided with cleats which discourage shifting of the brace member itself.

The apparatus of the present invention can be made of light weight aluminum for example, with an abrasive tread plate on the bottom portion for use in trailers with wooden floors and the like. If the device is to be used on smooth floors such as steel, rubber discs or the like can be used on the bottom portion of the device. The apparatus so designed, prevents pallet and load shift.

The device is particularly useful in trailers or containers, railroad boxcars, barges, airplanes, ships and the like, and is designed especially to accommodate palletized loads. The device is entirely self-supporting and prevents the shift of load as described more fully above. With the apparatus of the present invention, there is eliminated the need for blocking and bracing, thus it brings a savings to shippers or carriers since no extra labor is required during installation and the purchase of material and other undesirable payouts is no longer necessary. It will also prevent costly repairs to both vehicles and the cargo.

The cargo support of the present invention can be installed when the forklift places the last pallet on each side of a trailer, for example, or like container in position. The operator of the forklift then backs up, leaving the blades under the pallet enough to lift the pallet a few inches. The cargo support is then placed in position under the pallet, and a backboard inserted between the apparatus and the load in an upright vertical position. The pallet is then lowered by the lift truck and the load is ready for transportation. The apparatus provides a beveled support at its ground contacting surface portion which shifts the weight of the pallets away from the cargo support and retains them in their placed position.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
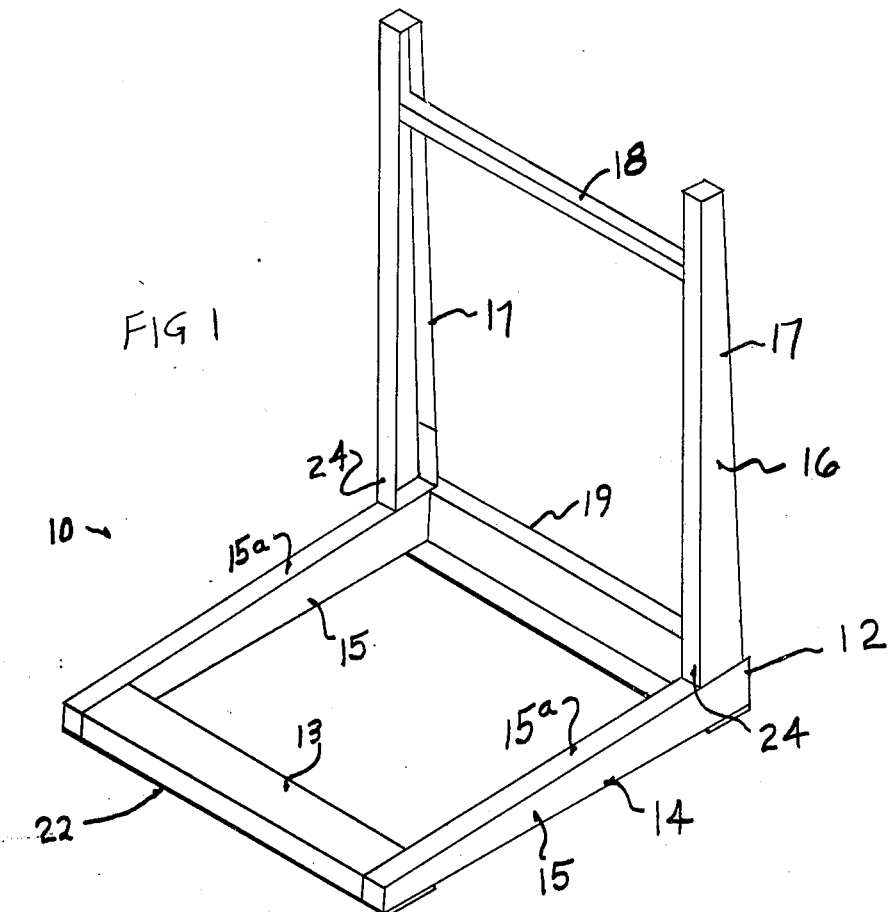
FIG. 1 is a perspective view of the preferred embodiment of the apparatus of the present invention.

As can best be seen in FIG. 1, the preferred embodiment of the present invention is designed generally by the numeral 10. The cargo support 10 of the present invention provides a lower horizontal floor contacting member 14 to which is rigidly connected an upper vertical brace member 16.

The upper vertical brace member 16 is comprised of a pair of vertical column members 17 and a horizontal upper cross-brace 18. Thus, the upper vertical brace member 16 is constructed with a minimum of materials and weight and a maximum of structural integrity.

The lower horizontal floor contacting member 14 is comprised of a pair of horizontal tapered feet 15 which are joined at their respective end portions by feet crossbar 13 and lower crossbrace 19. Lower crossbrace 19 joins feet 15 in proximity to the connection of upper brace member 16 with overall lower horizontal floor contact member 14 and thus cross brace 19 lends overall structural integrity to cargo support 10.

Figure 3:
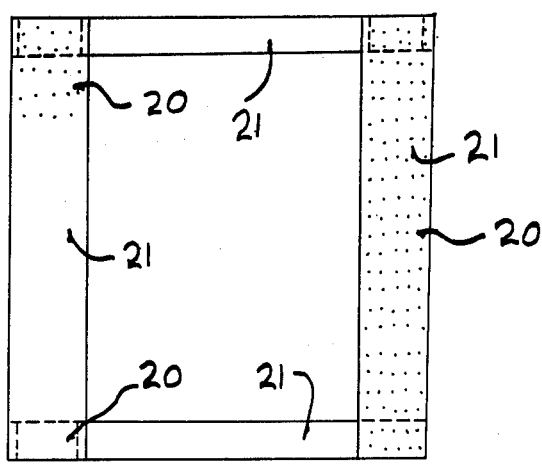
FIG. 3 is a sectional view taken along lines 3—3 of FIG. 2.

As can best be seen in FIG. 3, the lowermost portion of lower horizontal floor contacting member 14 provides a floor contacting surface 21 to which a plurality of cleats 20 can be affixed. It can be seen from the above that the cleats 20 on the lower surface 21 of lower floor contacting member 14 provides an "anti-skid" nature to cargo support 10.

Figure 2:
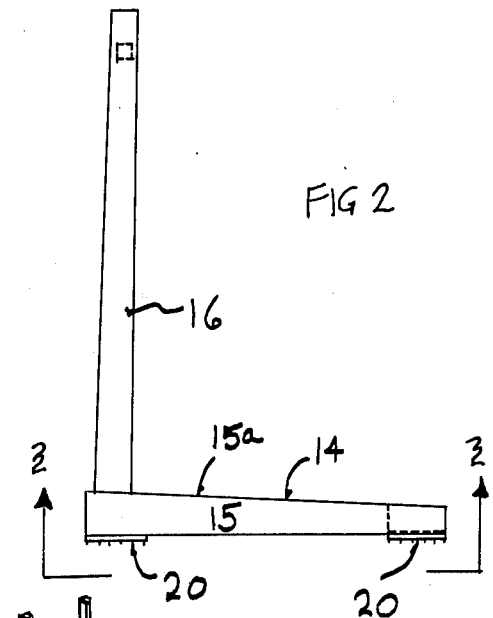
FIG. 2 is a side view of the preferred embodiment of FIG. 1.

The taper of tapered feet 15 provides an inclination to any load or like flat item placed thereon. As can best be seen by FIG. 2, the upper surface 15A of tapered 15 provides an angle of a few degrees with the ground surface on which cargo support 10 rests. The angle would normally be on the order of a few degrees so as to provide a "tilt" to any load resting thereon but not such a great angle as to cause the load to actually slide off tapered feet 15 and the cargo support 10.

Upper vertical brace member 16 is substantially vertically oriented with respect to the upper surface upon which cargo support 10 rests. Thus it can be seen that the angle formed between upper vertical brace member 16 and the upper surface of tapered feet 15 would be substantially equal to ninety (90°) degrees.

Figure 4:
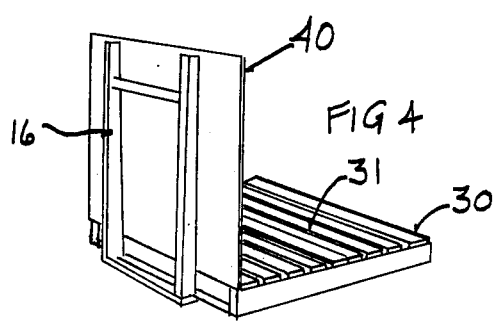
FIG. 4 is a perspective view illustrating the preferred embodiment of the apparatus of the present invention used in conjunction with a standard load pallet and a vertical backing board.
Figure 5:
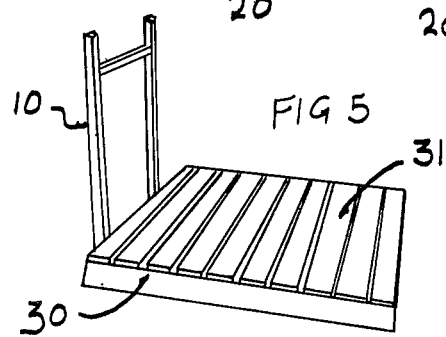
FIG. 5 is a perspective view of the preferred embodiment of the apparatus of the present invention illustrating its use in conjunction with a standard load pallet.

FIGS. 4 and 5 illustrate the use of a standard pallet which can be manufactured of for example, wood, used in conjunction with the cargo support 10 of the present invention.

As can be seen best by FIG. 4, pallet 30 provides an upper surface 31 onto which various desired items can be placed which form part of the cargo to be carried, and a lower surface 32 which rests on the lower horizontal floor contacting member 14. The pallet 30 would thus contact tapered feet 15 at their upper surface 15A and the upper surface also of foot crossbar 13.

As can best be seen by FIG. 1, the smallest thickness of lower horizontal contacting member 14 is provided at its insertion tip 22. This small thickness tip 22 can be easily slid under the pallet 30 when the pallet 30 is slightly raised off the ground by a distance which allows the device to be placed thereunder. In the preferred embodiment, the width of cargo support 10 (i.e., the distance between either vertical column member 17 or tapered feet 15) would be a distance different than the normal width between the forklift portions of a standard forklift, thus allowing the forklift to lift the pallet 30 upward allowing the device to be placed thereunder without any interference from the actual forklifting portions.

The presence of cleats 20 on cargo support 10 would discourage any sliding of the device and its carried load once in position. By its very nature, the more load that is applied to the device, the greater the force applied to cleats 20 and the greater their "bite" into the surface upon which they are resting. Cleats 20 could be metal spikes if a wooden floor or like surface were to be contacted. Rubber discs could be used for cleats 20 if a smooth surface were to be contacted such as a polished floor, a steel floor or the like.

The combination of the tapered effect provided by tapered feet 15 and the cleats 20 on the lower surface 21 of lower horizontal contacting member 14 provide an excellent anti-skid feature to the present invention.

This anti-skid feature of the invention discourages movement of the palletized load in the nature of sliding, slipping and the like.

Upper vertical brace member 16 is provided to prevent tilting or toppling of the palletized load. Additionally, the tapered effect produced by lower horizontal floor contacting member 14 causes the palletized load to shift its center of gravity away from cargo support 10 and thus discourage tipping, toppling or tilting of the palletized load in a direction towards the cargo support 10.

The cargo support 10 could be constructed for example of structural aluminum, having an exemplary width of twenty-six (26") inches, an exemplary length of twenty eight inches (28") and an exemplary height of forty inches (40"). Such an exemplary embodiment would weigh approximately twenty seven pounds (27 lbs).

OPERATION

The device would normally be used with palletized loads as explained more fully above. When a forklift or like loading equipment places the last pallet on each side of a trailer, airplane, truck or like container into its final position, the operator of the forklift would then back up leaving the blade portions of the forklift under the last pallet 30 enough to lift the pallet 30 a few inches. The cargo support 10 would thereafter be placed in position under the pallet, and a backing board 40 (see FIG. 4) then inserted adjacent to upper vertical brace member 16 if the palletized load were of any height to speak of. Thereafter the pallet would then be lowered until it seated upon cargo support 10 thus making the load ready for transportation. The apparatus has a taper which causes the pallets to remain in position, discouraging any movement towards the pallet and away from the concentrated load of material.

The device would be especially useful in preventing fore and aft movement associated with trucks which normally have such movement due to acceleration or braking.

For use with railroad boxcars, the device could be used in such a manner as to prevent lateral movement when the car is swayed from side to side. Thus, the device uses the weight of the load itself to create a force for retaining the load in a desired location or configuration. The cargo support 10 of the present invention would prevent the movement of pallets, skidded or loose items as needed.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A cargo support brace comprising:
   a. a lower floor contacting member, said lower floor contacting member providing a lower ground contacting surface and an upper load bearing surface, said upper load bearing surface being capable of receiving a palletized cargo load thereon, said ground contacting surface and said load bearing surface being angularly deposed to provide a bevel to said lower floor contacting member, said lower floor contacting member comprising a pair of spaced tapered feet and at least one structural cross brace rigidly connecting said pair of spaced tapered feet; and
   b. an upper substantially vertically mounted brace member rigidly connected during operation to said lower floor contacting member, the connection being at the respective end portions of said upper brace member and said lower floor contacting member, said vertical brace member being attached to the thickest end portion of said tapered feet.

2. The cargo support of claim 1, wherein said ground contacting surface portion of said lower floor contacting member is provided with a plurality of surface gripping projections thereon.

3. The cargo support of claim 2, wherein said upper vertical brace member is tapered having a thicker base portion adjacent the connection it forms with said lower floor contacting member and an upper narrow portion at its opposite ends.

4. The cargo support of claim 3, wherein said lower floor contacting member is beveled by a measure of at least one (1°) degree.

5. The cargo support of claim 2, wherein said plurality of gripping projections are metal spikes.

6. The cargo support of claim 2, wherein said plurality of gripping projections are rubberized discs.

7. The cargo support of claim 2 wherein said anti-skid means is a plurality of spike projections.

8. The cargo support of claim 2 wherein said anti-skid means is a plurality of rubberized discs.

9. A cargo support brace comprising:
   a. a lower floor contacting frame member, said lower frame member providing a lower ground contacting surface and an upper load bearing surface, said upper load bearing surface being capable of receiving a palletized cargo load thereon, said load bearing surface being angularly deposed to provide a bevel to said floor contacting member, said bevelled lower floor contacting frame member comprising a spaced pair of tapered feet rigidly connected by a structural cross brace, each of said feet having a thickened end portion tapering to a thinner tip portion;
   b. an upper substantially vertically mounted support frame rigidly connected during operation to said lower support frame, the connection being at the thickened end portions of said pair of tapered feet, said upper support frame preventing movement of the palletized cargo load in at least one lateral direction; and
   c. anti-skid means on said lower floor contacting member for discouraging slippage of said lower floor contacting frame member along the surface contacted.

10. A cargo support brace comprising:
   a. a lower horizontal contacting member, said floor contacting member comprising,
      i. a pair of horizontal spaced tapered feet, the thinnest tip portion of each of said tapered feet providing an insertion tip to said floor contacting member for insertion under shipping pallets.
      ii. at least one crossbrace rigidly connecting said pair of tapered feet,
      said floor contacting member having a lower ground contacting surface and an upper load receiving surface capable of receiving a palletized load thereon, said upper and lower surfaces being angularly deposed providing a tilt to any load placed on said load receiving surface, each of said tapered feet having a thickened end portion tapering to a reduced thickness tip portion;
   b. a vertical brace member comprising a pair of substantially vertical column members and a cross brace rigidly connecting said pair of vertical column members, each of said vertical column members being rigidly attached to the thickened end portion respectively of said pair of tapered feet; and
   c. a plurality of gripping cleats on said lower floor contacting member said cleats discouraging slippage of said lower floor contacting member along the surface contacted.

* * * * *